United States Patent
Takahashi

(10) Patent No.: US 11,990,636 B2
(45) Date of Patent: May 21, 2024

(54) POWER SUPPLY DEVICE, ELECTRIC VEHICLE USING SAME, AND POWER STORAGE DEVICE

(71) Applicant: SANYO Electric Co., Ltd., Osaka (JP)

(72) Inventor: Hiroyuki Takahashi, Hyogo (JP)

(73) Assignee: SANYO Electric Co., Ltd., Osaka (JP)

( * ) Notice: Subject to any disclaimer, the term of this patent is extended or adjusted under 35 U.S.C. 154(b) by 182 days.

(21) Appl. No.: 17/630,557

(22) PCT Filed: Jul. 20, 2020

(86) PCT No.: PCT/JP2020/028023
§ 371 (c)(1),
(2) Date: Jan. 27, 2022

(87) PCT Pub. No.: WO2021/024771
PCT Pub. Date: Feb. 11, 2021

(65) Prior Publication Data
US 2022/0247029 A1    Aug. 4, 2022

(30) Foreign Application Priority Data
Aug. 7, 2019    (JP) .................................. 2019-145724

(51) Int. Cl.
*H01M 50/282*    (2021.01)
*B60L 53/60*    (2019.01)
(Continued)

(52) U.S. Cl.
CPC ........... *H01M 50/282* (2021.01); *B60L 53/60* (2019.02); *H01M 10/441* (2013.01);
(Continued)

(58) Field of Classification Search
CPC ............. H01M 50/282; H01M 50/209; H01M 50/233; H01M 10/441; H01M 10/46; H01M 2220/20; B60L 53/60; H02J 7/0013
See application file for complete search history.

(56) References Cited

U.S. PATENT DOCUMENTS

2011/0229754 A1* 9/2011 Zhao ................. H01M 10/0472
29/730
2014/0220391 A1* 8/2014 Fujii ................... H01M 50/264
429/7
(Continued)

FOREIGN PATENT DOCUMENTS

CN    105190934 A    12/2015
JP    2012-084447    4/2012
(Continued)

OTHER PUBLICATIONS

International Search Report of PCT application No. PCT/JP2020/028023 dated Sep. 24, 2020.
(Continued)

*Primary Examiner* — Jared Fureman
*Assistant Examiner* — Duc M Pham
(74) *Attorney, Agent, or Firm* — WHDA, LLP

(57) ABSTRACT

A power supply device includes battery stack having a plurality of battery cells and extended in one direction, and insulating cover part covering one surface of battery assembly extended in one direction. Cover part includes, in the extending direction, a plurality of fixtures for fixing to the upper surface side of battery assembly, and cover part includes metal core material.

10 Claims, 15 Drawing Sheets

(51) Int. Cl.
*H01M 10/44* (2006.01)
*H01M 10/46* (2006.01)
*H01M 50/209* (2021.01)
*H01M 50/233* (2021.01)
*H01M 50/276* (2021.01)
*H01M 50/278* (2021.01)
*H02J 7/00* (2006.01)

(52) U.S. Cl.
CPC ......... *H01M 10/46* (2013.01); *H01M 50/209* (2021.01); *H01M 50/233* (2021.01); *H01M 50/276* (2021.01); *H01M 50/278* (2021.01); *H02J 7/0013* (2013.01); *H01M 2220/20* (2013.01)

(56) References Cited

U.S. PATENT DOCUMENTS

| | | | |
|---|---|---|---|
| 2015/0093615 A1* | 4/2015 | Yoshioka | H01M 50/519 429/93 |
| 2015/0333304 A1 | 11/2015 | Sekine | |
| 2019/0334145 A1 | 10/2019 | Omura et al. | |
| 2020/0243830 A1 | 7/2020 | Tanaka et al. | |
| 2021/0050572 A1 | 2/2021 | Omura et al. | |

FOREIGN PATENT DOCUMENTS

| | | | |
|---|---|---|---|
| JP | 2012084447 A * | 4/2012 | ............. H01M 2/10 |
| WO | 2013/031613 | 3/2013 | |
| WO | 2014/103007 | 7/2014 | |
| WO | 2018/012224 | 1/2018 | |
| WO | 2018/168982 | 9/2018 | |

OTHER PUBLICATIONS

English translation of Search Report dated Oct. 14, 2023, issued in counterpart CN Application No. 202080056401.2. (3 pages).

* cited by examiner

POWER SUPPLY DEVICE, ELECTRIC VEHICLE USING SAME, AND POWER STORAGE DEVICE

CROSS-REFERENCE TO RELATED APPLICATIONS

This application is a U.S. national stage application of the PCT International Application No. PCT/JP2020/028023 filed on Jul. 20, 2020, which claims the benefit of foreign priority of Japanese patent application No. 2019-145724 filed on Aug. 7, 2019, the contents all of which are incorporated herein by reference.

TECHNICAL FIELD

The present invention relates to a power supply device, and an electric vehicle and a power storage device using the same.

BACKGROUND ART

The power supply device is used for a power supply device for driving an electric vehicle, a power supply device for power storage, and the like. Such a power supply device has a plurality of chargeable and dischargeable battery cells that are stacked. As in power supply device 900 shown in a perspective view of FIG. 15 for example, end plate 903 is disposed on each of both end surfaces of a battery stack in which battery cells 901 having prismatic outer covering cans are alternately stacked together with insulating spacers 902, and end plates 903 are fastened to each other with bind bars 904 made of metal. Top cover 905 made of an insulating resin or the like is provided on an upper surface of the battery stack. Such a top cover is fitted to the upper surface of the battery stack using screws 906 and claws at predetermined intervals.

In recent years, with the demand for higher capacity, the number of stacked battery cells constituting a battery stack tends to increase. As a result, the overall length of the battery stack becomes longer in accordance with the number of battery cells, and the length of the top cover also becomes longer accordingly. However, when the length becomes longer with respect to the width of the top cover, the aspect ratio between height and width gets worse, and undulation and warpage of the resin-molded top cover are increased. As a result, there has been a problem that the positions of the screws and the claws change and fitting cannot be performed. When the top cover has undulation or warpage, a gap is provided between the top cover and the battery stack. When any of the battery cells thermally runs away, air may enter through this gap, and oxygen may burn to generate flame.

In order to avoid such a decrease in molding accuracy, it is conceivable to divide the top cover, but in this case, there has been a problem that the number of components increases, the number of assembly steps increases, and the cost increases.

CITATION LIST

Patent Literature

PTL 1: WO 2018/012224

SUMMARY OF THE INVENTION

An object of the present invention is to provide a power supply device that can be stably attached to a battery stack even when a top cover covering the battery stack is long, and an electric vehicle and a power storage device using the same.

A power supply device according to a first aspect of the present invention includes: a battery assembly including a plurality of battery cells and extended in one direction; and an insulating cover part covering one surface extended in one direction of the battery assembly, in which the cover part includes a plurality of fixtures for fixing the cover part to an upper surface of the battery assembly, the fixtures provided in an extension direction, and the cover part can include a metal core material. With the above configuration, even when the insulating cover part has an extended elongated shape, warpage and undulation can be suppressed by the metal core material, and the fixtures can be provided at predetermined positions, so that the reliability of fixing to the battery assembly can be enhanced.

In the power supply device according to a second aspect, in addition to the above configuration, the plurality of battery cells each have a prismatic outer covering can, the battery assembly is a stack in which a plurality of battery cells are stacked, the power supply device further includes a pair of end plates covering both side end surfaces of the battery stack in which the plurality of battery cells are stacked, and a separator held between the battery cells in a state where the plurality of battery cells are stacked, and the separator can include a reception part receiving the fixture at a position corresponding to the fixture in a state where the cover part is fixed.

In the power supply device according to a third aspect, in addition to any of the above configurations, the power supply device can further include a holder part provided between the cover part and an upper surface of the stack of the battery cells, and the holder can include a reception part receiving the fixture at a position corresponding to the fixture in a state where the cover is fixed.

In the power supply device according to a fourth aspect, in addition to any of the above configurations, the plurality of battery cells each include a safety valve that opens in response to an internal pressure change, and an upper surface of the battery assembly can be a surface of the plurality of battery cells on which the safety valve is provided. With the above configuration, even when the safety valve is opened and high pressure gas is released from the upper surface of the battery stack, deformation of the cover part is suppressed by the core material, and the safety is improved.

The power supply device according to a fifth aspect, in addition to any of the above configurations, the cover part is made of resin, and the core material can be formed into a plate shape. With the above configuration, since the core material has a plate shape, the entire upper surface of the battery assembly can be covered without a gap. This can increase the strength of the upper surface side of the battery assembly, and enhance the reliability of the battery assembly. It is possible to suppress warpage and undulation of the cover part by the plate-like core material even when the cover part has an elongated shape in which the cover part is extended while securing insulation properties by the cover part made of resin.

According to the power supply device according to a sixth aspect, in addition to any of the above configurations, at least a part of the plate-shaped core material can be exposed from the cover part. The above configuration can enhance the heat dissipation to the outside from the part of the core material exposed from the cover part.

According to the power supply device according to a seventh aspect, in addition to any of the above configurations, the plate-shaped core material can include, at both ends thereof, an exposed part that is exposed from the cover part and is extended and fixed to upper surfaces of the pair of end plates. With the above configuration, since the core material is also fixed to the end plate in addition to the fixture of the cover part, the cover part is hardly detached from the battery stack.

The power supply device according to an eighth aspect, in addition to any of the above configurations, the cover part is made of resin, and the core material can be provided into a plurality of rod shapes embedded apart in the resin. The above configuration can reduce the volume of the core material, and suppress an increase in weight due to the addition of the core material.

According to the power supply device according to a ninth aspect, in addition to any of the above configurations, the cover part can be insert-molded in the core material.

According to the power supply device according to a tenth aspect, in addition to any of the above configurations, the cover part includes a rectangular shape, and the rectangular shape can have an aspect ratio of 5 or more.

According to a vehicle according to an eleventh aspect of the present invention, the vehicle including any of the above power supply devices, and can include the power supply device, a running motor to which electric power is supplied from the power supply device, a vehicle body on which the power supply device and the motor are mounted, and wheels that are driven by the motor to cause the vehicle body to travel.

A power storage device according to a twelfth aspect of the present invention, the power storage device including any of the above power supply devices, includes: the power supply device; and a power supply controller that controls charging to and discharging from the power supply device, in which the power supply controller enables charging to the battery cell with electric power from an outside, and controls charging to the battery cell.

DESCRIPTION OF EMBODIMENTS

Figure 1:
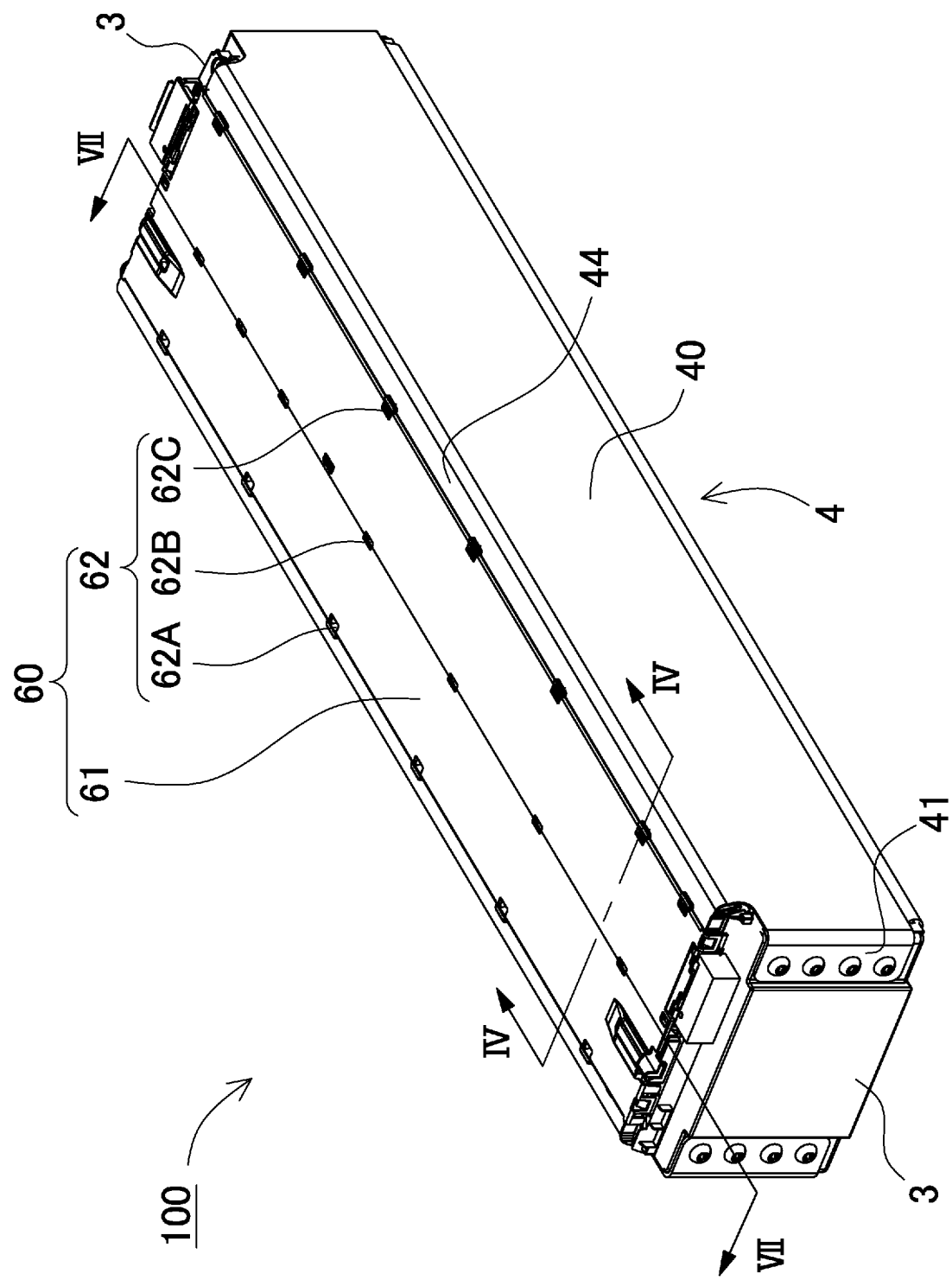
FIG. 1 is a perspective view showing a power supply device according to a first exemplary embodiment.

Exemplary embodiments of the present invention will be described below with reference to the drawings. However, the exemplary embodiments described below are examples that allow a technical idea of the present invention to be embodied, and the present invention is not limited to the exemplary embodiments described below. In the present description, components described in the scope of claims are not limited to the components of the exemplary embodiments. In particular, it is not intended to limit the scope of the present invention to sizes, materials, shapes of components, relative arrangement of the components, and the like that are described in the exemplary embodiments, unless otherwise specified. The sizes, materials, shapes of the components, and the relative arrangement of the components are mere explanation examples. Note that the sizes, the positional relation, and the like of the components in the drawings may be exaggerated for clarifying the explanation. Furthermore, in the following description, the same names or the same reference marks denote the same components or components of the same type, and detailed description is appropriately omitted. Regarding the elements constituting the present invention, a plurality of elements may be formed of the same component, and one component may serve as a plurality of elements. In contrast, the function of one component may be shared by a plurality of components. Contents described in some examples or exemplary embodiments can be used, for example, in other examples or exemplary embodiments.

The power supply device according to exemplary embodiments can be used in various applications including a power source that is mounted in a hybrid automobile, an electric automobile, or another electric vehicle to supply electric power to a running motor, a power source that stores power generated by natural energy such as photovoltaic power generation and wind power generation, and a power source for storing late-night power. In particular, the power supply device can be used as a power supply suitable for high power and high current applications. In an example below, exemplary embodiments in which the power supply device is applied to a power supply device for driving an electric vehicle will be described.

First Exemplary Embodiment

Figure 2:
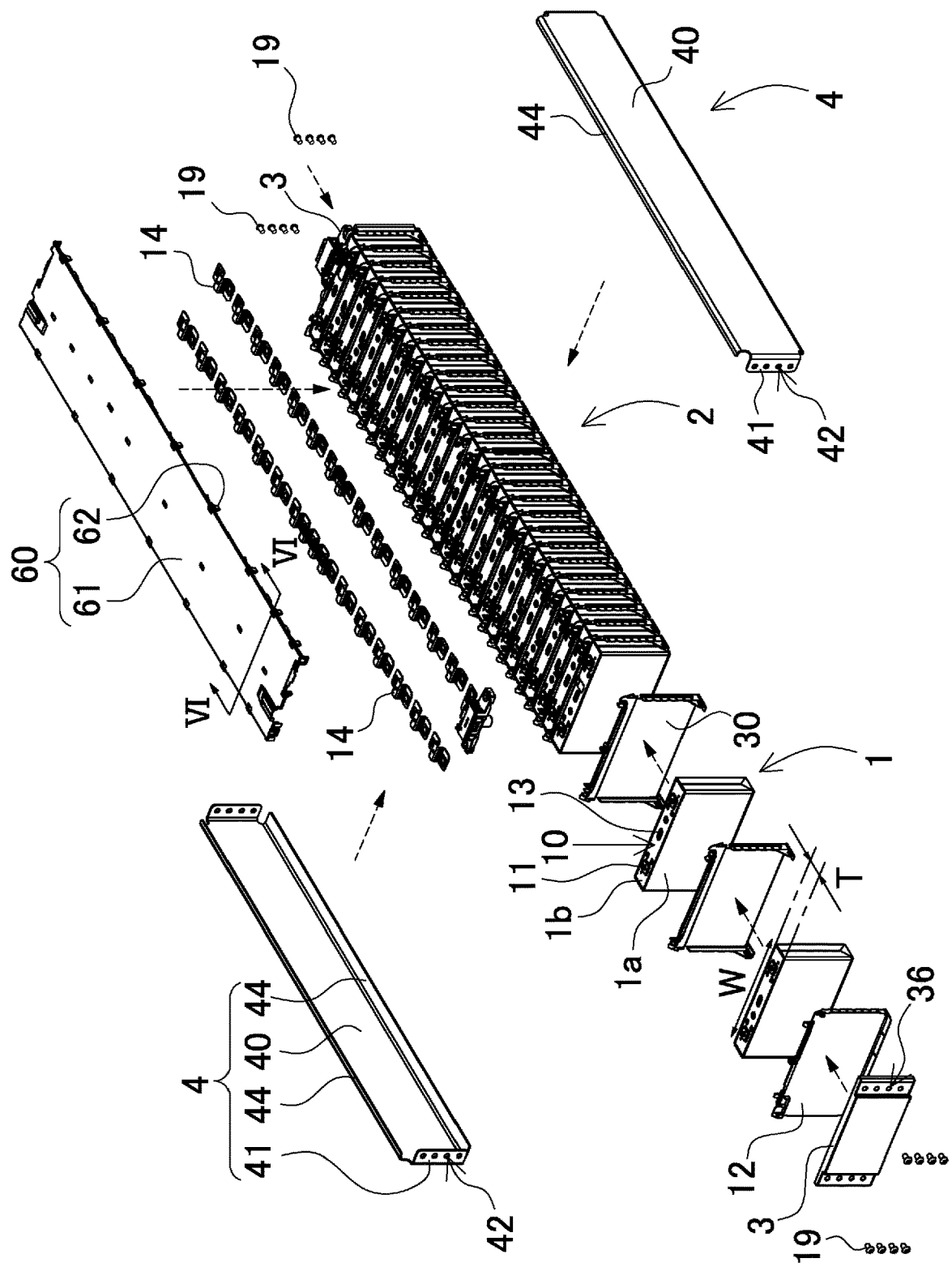
FIG. 2 is an exploded perspective view of the power supply device of FIG. 1.
Figure 3:
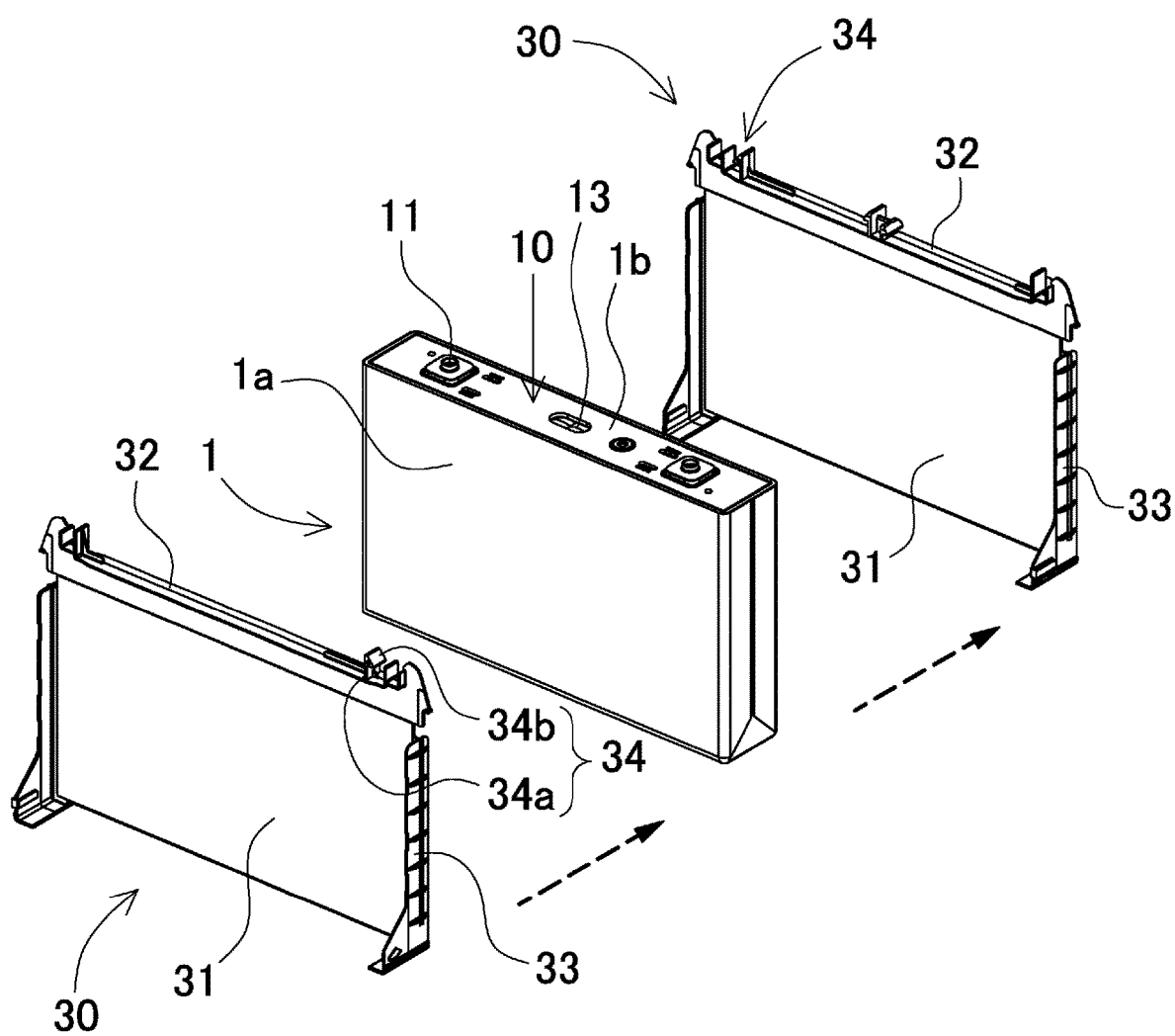
FIG. 3 is a perspective view showing a battery cell and a separator of FIG. 2.
Figure 4:
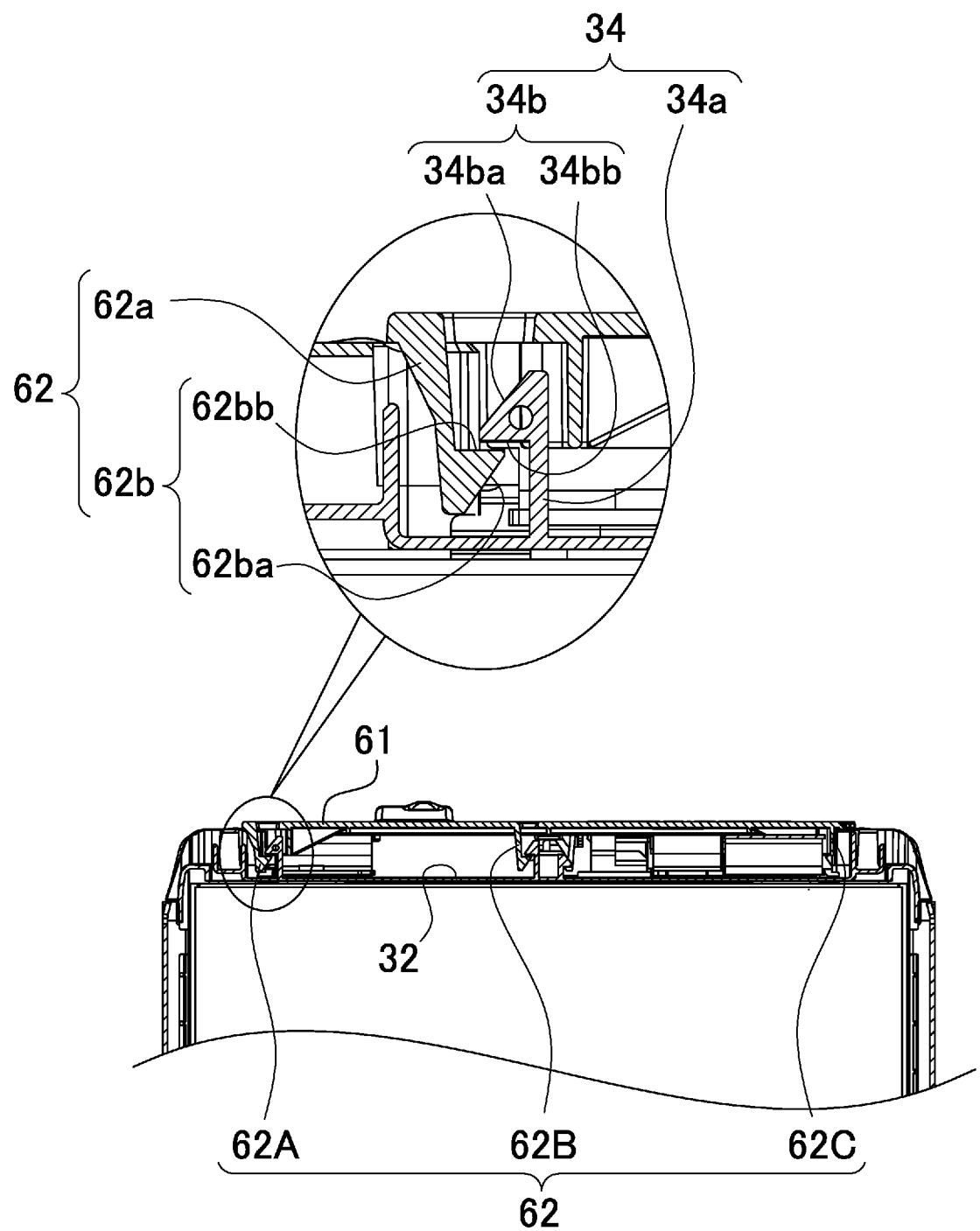
FIG. 4 is a cross-sectional view with a partially enlarged view taken along line IV-IV of the power supply device of FIG. 1.
Figure 6:
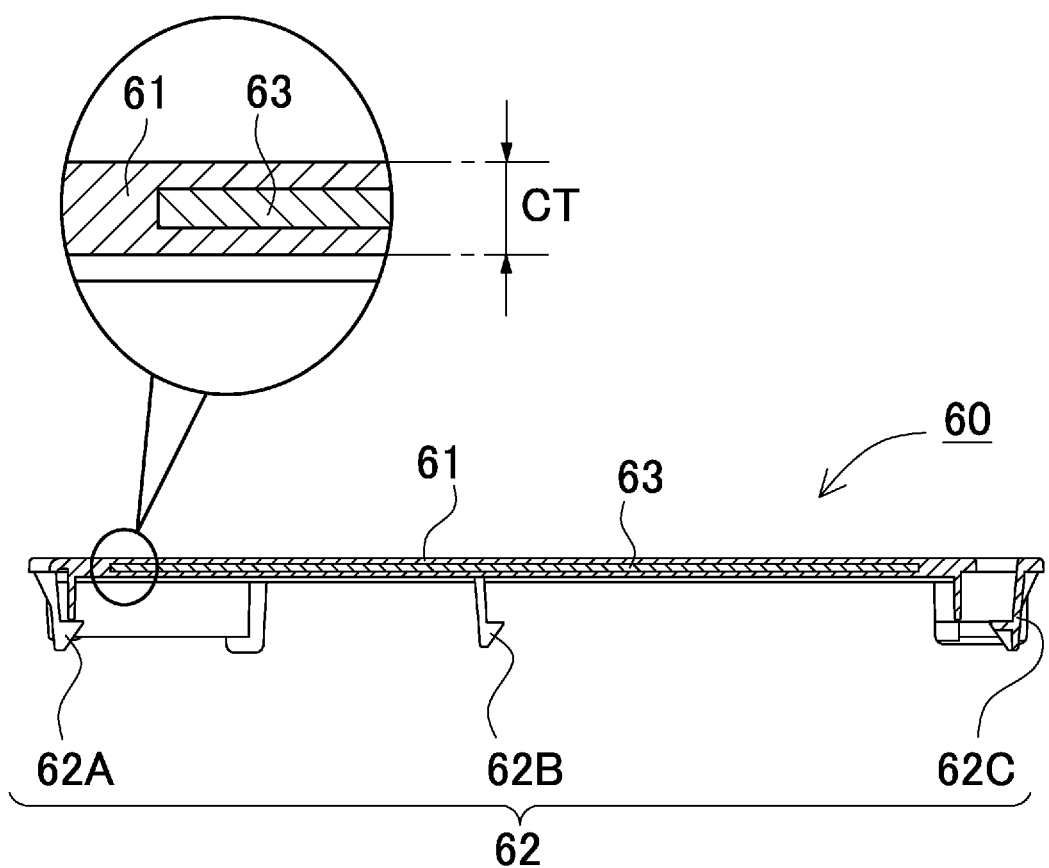
FIG. 6 is a transverse cross-sectional view with a partially enlarged view taken along line VI-VI of a cover part of FIG. 2.
Figure 7:
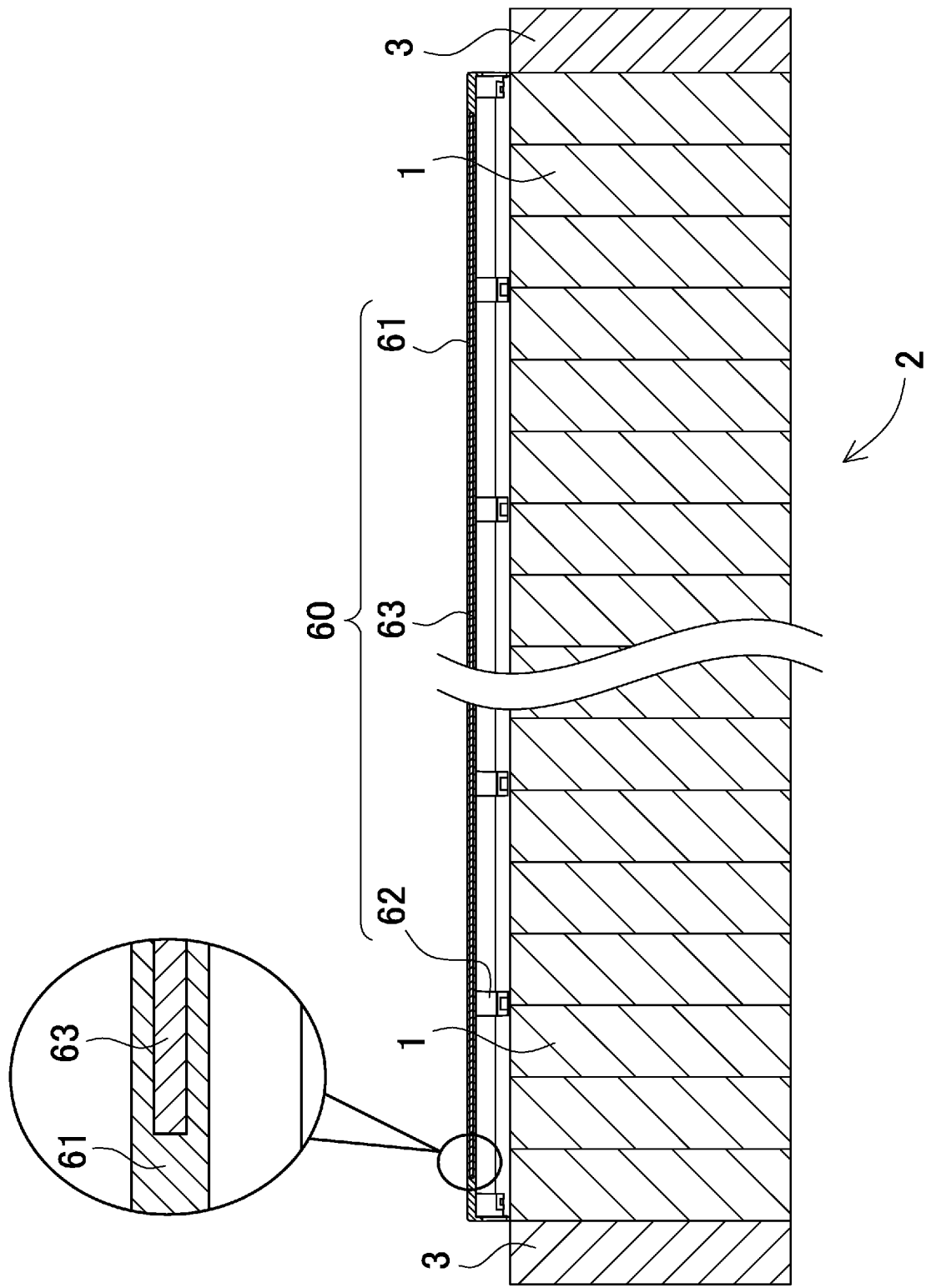
FIG. 7 is a schematic longitudinal cross-sectional view with a partially enlarged view taken along line VII-VII of the power supply device of FIG. 1.

A power supply device according to a first exemplary embodiment of the present invention is shown in FIGS. 1 to 4, 6, and 7. In these figures, FIG. 1 is a perspective view showing the power supply device according to the first exemplary embodiment, FIG. 2 is an exploded perspective view of the power supply device of FIG. 1, FIG. 3 is a perspective view showing the battery cell and the separator of FIG. 2, FIG. 4 is a cross-sectional view with a partially enlarged view taken along line IV-IV of the power supply device of FIG. 1, FIG. 6 is a transverse cross-sectional view taken along line VI-VI of a cover part of FIG. 2, and FIG. 7 is a schematic longitudinal cross-sectional view taken along line VII-VII of the power supply device of FIG. 1. Power supply device 100 shown in these figures includes battery stack 2 in which a plurality of battery cells 1 are stacked, a pair of end plates 3 disposed at both ends in a stacking direction of battery stack 2, a pair of fastening members 4 whose both ends are coupled to the pair of end plates 3 to fasten battery stack 2, and cover part 60 that covers an upper surface of battery stack 2.

(Battery Cell 1)

As shown in FIG. 2, battery cells 1 are prismatic batteries in which width W is wider than thickness T, in other words, the thickness is thinner than the width, and are stacked in the thickness to be battery stack 2. Battery cell 1 can be, for example, a lithium ion secondary battery. The battery cell can be any chargeable secondary battery such as a nickel hydride battery and a nickel cadmium battery. Battery cell 1 houses positive and negative electrode plates in outer covering can 1a having a sealed structure together with an electrolytic solution. Exterior can 1a includes a metal sheet such as aluminum or an aluminum alloy press-molded into a rectangular shape, and has an opening part that is hermetically sealed with sealing plate 1b. Sealing plate 1b is made of the aluminum or an aluminum alloy same as prismatic outer covering can 1a, and positive and negative electrode terminals 11 are fixed to both end parts of sealing plate 1b. Sealing plate 1b is provided with, between positive and negative electrode terminals 11, gas discharge valve 13, which is a safety valve that opens in response to an internal pressure change of each of battery cells 1.

The plurality of battery cells 1 are stacked with the thickness direction of each battery cell 1 being the stacking direction to constitute battery stack 2. At this time, by providing more stacks than usual, it is possible to increase output of battery stack 2. In such a case, battery stack 2 is long and extended in the stacking direction. Terminal surfaces 10 provided with positive and negative electrode terminals 11 are arranged on the same plane, and thus the plurality of battery cells 1 are stacked to constitute battery stack 2. The upper surface of battery stack 2 is a surface provided with gas discharge valves 13 of the plurality of battery cells 1.

(Separator 30)

As shown in FIGS. 2 and 3, in battery stack 2, separator 30 is held between battery cells 1 that are stacked. Separator 30 includes mounting plate part 31 constituting a main surface of separator 30, upper peripheral wall 32 provided on an upper peripheral edge of mounting plate part 31, and longitudinal peripheral walls 33 provided on both sides of a short side of mounting plate part 31.

Mounting plate part 31 is a part held between battery cells 1 adjacent to each other. Mounting plate part 31 has a plate shape having substantially the same size as the facing surface of battery cells 1, and separator 12 is stacked between battery cells 1 adjacent to each other to insulate battery cells 1 adjacent to each other. Substantially similarly to the facing surface of battery cells 1, mounting plate part 31 has a rectangular shape having long sides that are long in a width W and short sides.

Upper peripheral wall 32 is provided at an upper end of mounting plate part 31, and is locked to sealing plate 1b of battery cell 1. The upper surface of upper peripheral wall 32 includes a separator-side locking piece 34 described later.

On the other hand, longitudinal peripheral wall 33 is provided to be orthogonal to narrowly held plate part 31. One end part on the lower side of longitudinal peripheral wall 33 slightly protrudes toward one of battery cells 1 adjacent to each other, and is partially bent along the bottom side of narrowly held plate part 31. With such a shape, separator 30 can easily stand by itself, and the lower corner parts of battery cells 1 adjacent to each other can be held by the protruding part and the bent part, so that battery cells 1 adjacent to each other can be more reliably narrowly held.

(Battery Stack 2)

In battery stack 2, bus bar 14 made of metal is connected to positive and negative electrode terminals 11 of battery cells 1 adjacent to each other, and the plurality of battery cells 1 are connected in series or in parallel or in series and in parallel by bus bar 14. A bus bar holder may be disposed between battery stack 2 and the bus bar. Use of the bus bar holder makes it possible to dispose the plurality of bus bars at fixed positions on the upper surface of the battery stack while insulating the plurality of bus bars from each other and insulating the terminal surfaces of the battery cells from the bus bars.

Bus bar 14 is manufactured into a predetermined shape by cutting and processing a metal sheet. As the metal sheet constituting the bus bar, a metal having low electrical resistance and light weight, for example, an aluminum sheet, a copper sheet, or an alloy of them can be used. However, for the metal sheet for the bus bar, another metal having low electrical resistance and light weight or an alloy of them can be used.

(End Surface Spacer 12)

End plates 3 are disposed on both end surfaces of battery stack 2 across end surface spacer 12. As shown in FIG. 2, end surface spacer 12 is disposed between battery stack 2 and end plate 3 to insulate end plate 3 from battery stack 2. End surface spacer 12 can be made of the same material as that of separator 30 described above.

(End Plate 3)

As shown in FIG. 2, end plates 3 are disposed on both ends of battery stack 2 and fastened via fastening members 4 disposed along both side surfaces of battery stack 2. End plates 3 are disposed at both ends of battery stack 2 in the stacking direction of battery cells 1 that is outside of end surface spacer 12, and hold battery stack 2 from both ends. End plate 3 can be made of metal. Each end plate 3 can have a greater rigidity at the upper end part than rigidity at the center part.

End plate 3 has a quadrangular outer shape, and is disposed facing the end surface of battery stack 2. End plate 3 shown in FIG. 2 has an outer shape substantially equal to the outer shape of battery cell 1. That is, in end plate 3 shown in the figure, the width in the left-right direction is equal to the width of battery cell 1, and the height in the up-down direction is equal to the height of battery cell 1. In the present description, the up-down direction means the up-down direction in the drawings, and the left-right direction means the left-right direction in the drawings, the left-right direction meaning the horizontal direction orthogonal to the stacking direction of the batteries.

A method for fixing this end plate is not particularly limited. For example, end plate 3 shown in FIGS. 1 and 2 has a plurality of through-holes for fixing end plates 3. End plate 3 has first through-hole 36 into which fastener 19 for fixing fastening member-side fixing part 41 of fastening member 4 is inserted. End plate 3 shown in the figures includes a plurality of through-holes opened as first through-hole 36. End plate 3 in the figures is provided with a plurality of first through-holes 36 spaced up-down apart from each other on both side parts at positions facing fastening member-side fixing part 41. End plate 3 shown in FIG. 2 is provided with a total of six first through-holes 36, three on each side. Fasteners 19 passing through the fastening member-side fixing parts 41 disposed on the outer peripheral surface of end plate 3 are inserted into first through-holes 36. Fastener 19 inserted into first through-hole 36 is fixed to first through-hole 36 to fix fastening member-side fixing part 41 at a fixed position.

(Fastening Member 4)

As shown in FIG. 2, fastening member 4 is extended in the stacking direction of battery stack 2, and both ends of fastening member 4 are fixed to end plates 3 disposed on both end surfaces of battery stack 2 to fasten battery stack 2 in the stacking direction via end plates 3. Fastening members 4 are metal sheets having a predetermined width and a predetermined thickness along the side surfaces of battery stack 2, and are disposed facing both side surfaces of battery stack 2. For fastening member 4, a metal sheet such as iron, preferably a steel sheet can be used. Fastening member 4 made of a metal sheet is bent into a predetermined shape by press-molding or the like.

Fastening member 4 includes fastening member body part 40 disposed along the side surface of battery stack 2, and fastening member-side fixing part 41 bent at both ends of fastening member body part 40 and fixed to the outer surface of end plate 3. Fastening member body part 40 has a rectangular shape with a size that covers battery stack 2 and almost entire end plates 3 disposed at both ends of battery stack 2. Fastening member body part 40 shown in FIGS. 1 and 2 covers almost entire side surface of battery stack 2 without any gap. However, fastening member body part 40 can be provided with one or more opening parts to expose a part of the side surface of the battery stack. In order to fix both ends of fastening member 4 to the pair of end plates 3, both ends of fastening member 4 are bent along the outer surface of end plate 3 to provide fastening member-side fixing part 41. Fastening member-side fixing parts 41 shown in FIGS. 1 and 2 cover both left and right side parts of end plate 3 with substantially equal height to fastening member body part 40 and end plate 3 in the up-down direction. Fastening member 4 is fixed to end plate 3 via fastener 19 inserted into through-hole 42 provided at the tip end of fastening member-side fixing part 41. Fastening member 4 further includes bent part 44 that holds the upper surface and the lower surface of battery stack 2 along the upper end part of the intermediate part except for the both end parts of fastening member body part 40. Bent part 44 holds the upper surface and lower surface of battery cell 1 constituting battery stack 2, thereby suppressing up-down positional shift of terminal surface 10 of each battery cell 1.

(Cover Part 60)

As shown in FIGS. 1 to 3, power supply device 100 includes cover part 60 that is disposed above battery stack 2 and covers the upper surface of battery stack 2. Cover part 60 has a substantially long rectangular shape having long sides and short sides. The aspect ratio of the long side and the short side of the rectangular shape is preferably 5 or more. This makes it possible to cope with battery stack 2 that is long and has many stacks of battery cells. Specifically, the long side is about 1 m to 1 m 20 cm, and the short side is about 140 mm to 170 mm.

As shown in the exploded perspective view of FIG. 2, cover part 60 includes cover body part 61 mainly made of an insulating resin and locking claw part 62.

(Locking Claw Part 62)

Locking claw part 62 is one form of the fixture for fixing cover part 60 to separator 30. The position and number of locking claw parts 62 are not particularly limited. As an example, as shown in FIG. 1, cover part 60 includes locking claw parts 62 in the extending direction with locking claw parts 62C offset to the right side of both end parts and locking claw parts 62A offset to the left side of both end parts. Locking claw part 62B is provided in the center part. Locking claw parts 62 adjacent in the extending direction are provided at substantially equal intervals. By providing locking claw parts 62 at equal intervals, it is possible to fix cover part 60 to battery stack 2 in a well-balanced manner. However, the present invention is not limited to an aspect in which locking claw parts 62 are provided at equal intervals. For example, intervals may be narrowed at portions where fixation is desired to be strengthened. In the power supply device of FIG. 1, the intervals between locking claw parts 62C on the front side are narrowed to strengthen the fixation of the right end part.

As shown in the cross-sectional view of FIG. 4 and the cross-sectional view of FIG. 6, each locking claw part 62 is formed into a claw shape. Locking claw parts 62 extend downward from cover body part 61. Specifically, locking claw extending part 62a extending downward while being slightly inclined from cover body part 61 toward separator-side locking piece 34 described later, and locking claw protruding part 62b provided on the tip end side of locking claw extending part 62a are provided. Locking claw protruding part 62b includes locking claw inclined surface 62ba inclined obliquely upward from the tip of locking claw extending part 62a toward separator-side locking piece 34, and locking claw contact surface 62bb substantially parallel to cover body part 61.

The protruding orientation of locking claw protruding part 62b is not particularly limited, as long as it can be engaged with a corresponding reception part (details will be described later). For example, in cover part 60 of FIG. 6, locking claw protruding part 62b of locking claw part 62A faces rightward. On the other hand, locking claw protruding part 62b of locking claw part 62C faces leftward. Locking claw protruding part 62b of locking claw part 62B provided at the center part of cover part 60 faces rightward in the example of FIG. 6, but may face one of the left and right directions.

(Separator-Side Locking Piece 34)

On the other hand, separator 30 includes the reception part that receives locking claw part 62 of cover part 60 on the upper surface of upper peripheral wall 32. Separator-side locking piece 34 is one aspect of the reception part that receives locking claw part 62. As shown in FIGS. 3 and 4, separator-side locking piece 34 has a claw shape that can be locked with locking claw part 62. Separator-side locking piece 34 extends upward from the upper surface of upper peripheral wall 32. Specifically, separator-side extending part 34a provided substantially perpendicular to the upper surface of upper peripheral wall 32 and separator-side protruding part 34b provided on the tip side of separator-side extending part 34a are provided. Separator-side protruding part 34b includes separator-side inclined surface 34ba inclined obliquely downward from the tip of separator-side extending part 34a toward locking claw part 62, and separator-side contact surface 34bb substantially parallel to the upper surface of upper peripheral wall 32.

As shown in FIG. 4, when cover part 60 is attached to battery stack 2, locking claw contact surface 62bb and separator-side contact surface 34bb are brought into contact with and fitted to each other. This makes it possible to fix cover part 60 to separator 30. Such a configuration makes it possible to reliably fix cover part 60 to battery stack 2. The mechanical stability of cover part 60 is increased, and cover part 50 can be hardly detached even by the pressure of high pressure gas at the time of gas discharge.

Modified Example (Holder Part 50)

Figure 5:
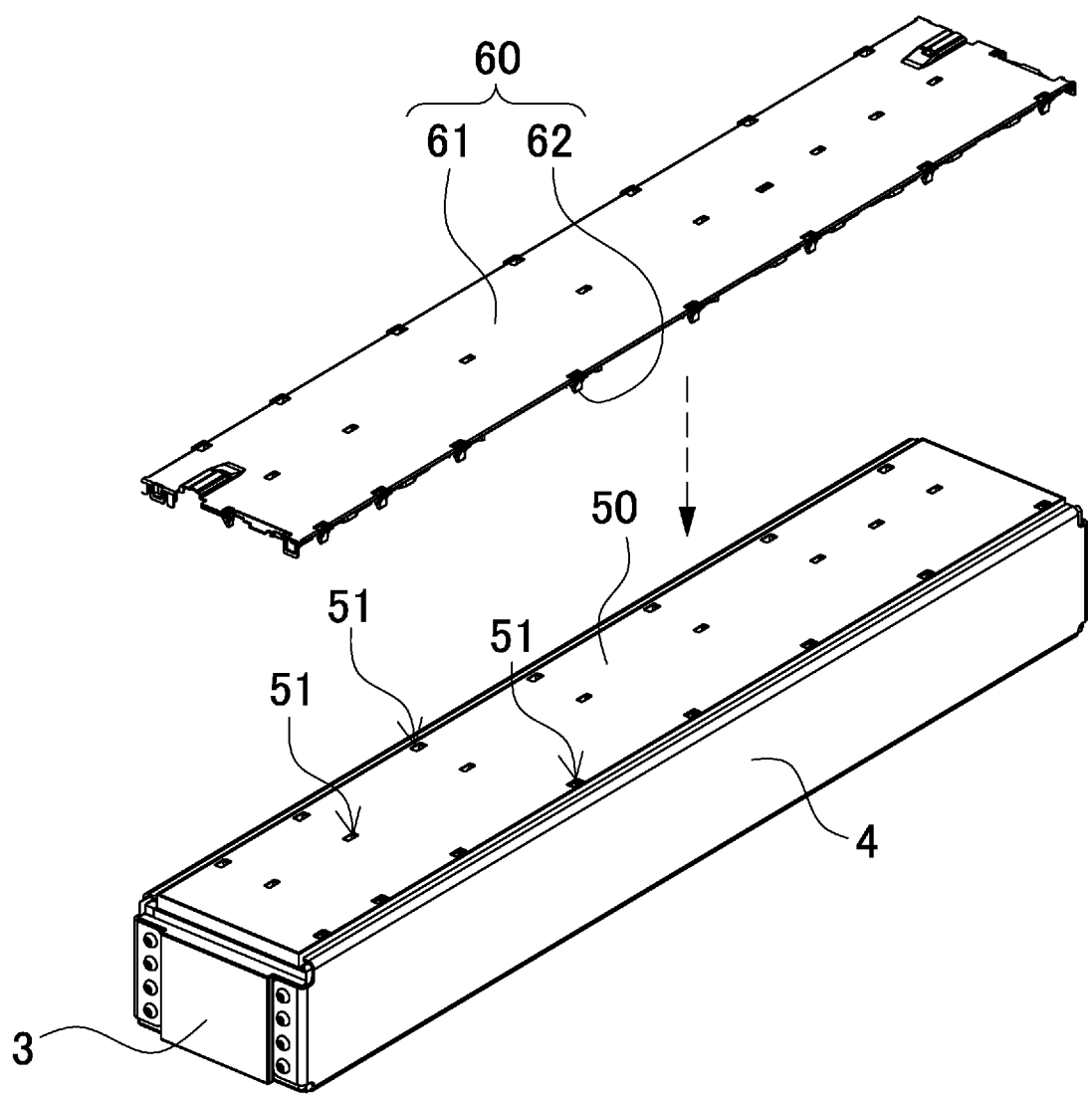
FIG. 5 is a partially exploded perspective view of a power supply device according to a modified example.

The present invention is not limited to an aspect in which a separator is used as a structure for fixing cover part 60 to battery stack 2. For example, a holder part may be provided to fix cover part 60 to the holder part. As an example, holder part 50 of modified example 1 is provided between the upper surface of battery stack 2 and cover part 60 as shown in FIG. 5, and covers the entire upper surface of battery stack 2. Holder part 50 has locking holes 51, which are reception parts for receiving locking claw parts 62 of cover part 60 described above, provided at both end sides and the center part in the extending direction. That is, holder part 50 opens locking hole 51 into which locking claw part 62 is inserted at a position corresponding to locking claw part 62. Locking claw part 62 is inserted into locking hole 51, and the tip end part of cover part-side inclined part 62b is brought into contact with the lower surface side of holder part 50 to lock cover part 60 to holder part 50. Also such a configuration makes it possible to reliably fix cover part 60 to holder part 50. The mechanical stability of cover part 60 is increased, and cover part 50 can be hardly detached even by the pressure of high pressure gas at the time of gas discharge.

Use of holder part 50 also as a bus bar holder that holds the bus bar makes it possible to further simplify the configuration. A voltage detector or the like that detects the voltage of battery cell 1 may be provided in holder part 50. Holder part 50 is preferably made of an insulating resin so as not to short-circuit battery stack 2.

In modified example 1, since holder part 50 fixes cover part 60, it is not necessary to provide the separator with a separator-side locking piece. Therefore, the separator may be manufactured in a thin plate shape or sheet shape with an insulating material. This makes it possible to simplify the configuration of the separator. However, the size and shape of the separator are not particularly limited. For example, the separator may have a shape in which a flow path for a cooling gas is provided between battery cell 1 and the spacer. The surface of battery cell 1 can also be covered with an insulating material. For example, the surface of outer covering can 1a excluding the electrode part of the battery cell may be thermally welded with a shrink tube or a shrink film made of such as a polyethylene terephthalate (PET) resin.

(Core Material 63)

As shown in FIGS. 6 and 7, cover part 60 includes metal core material 63 insert-molded in cover body part 61 made of resin. Thickness CT of cover body part 61 is about 2 mm to 3 mm. Core material 63 has a plate shape slightly smaller than cover part 60, and has a shape that can substantially cover the entire upper surface of battery stack 2.

Usually, when a long cover part having a high aspect ratio is molded with a resin in order to impart insulation properties, undulation and warpage are likely to occur. As a result, the position of the locking claw part may be deviated, and the fixing to the holder part may be hindered. External air easily enters from the undulating or warped part. In a case where gas discharge valve 13 of battery cell 1 is opened and a high-pressure gas is released from the upper surface of battery stack 2, external air is supplied to the inside of battery stack 2, and the state gets worse. Therefore, in the present exemplary embodiment, by core material 63 embedded in cover part 60, even when cover part 60 made of resin has an extended elongated shape, warpage and undulation can be suppressed by core material 63 made of metal, and locking claw parts 62 can be provided at expected positions, so that the reliability of fixing to battery assembly 2 can be enhanced. It is possible to avoid external air from being supplied due to warpage or undulation of cover part 60 and to improve safety.

Core material 63 is a metal sheet having excellent heat transfer properties and rigidity. For example, core material 63 is an iron sheet, stainless steel, a high-tensile steel sheet, an aluminum sheet, or the like. In addition to the metal sheet in a plate shape, core material 63 may have a mesh shape or a lattice shape.

Second Exemplary Embodiment

Figure 8:
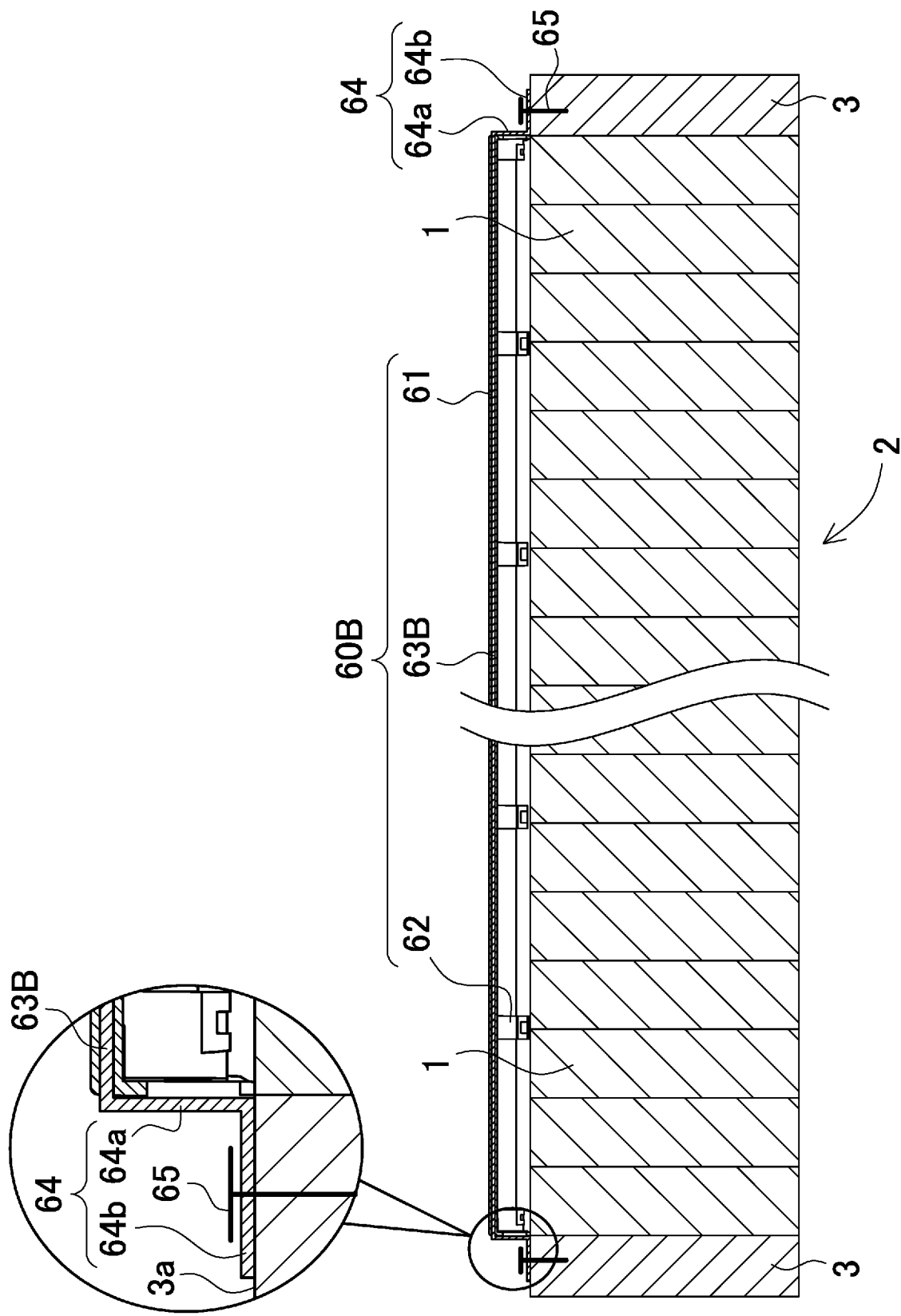
FIG. 8 is a schematic longitudinal cross-sectional view with a partially enlarged view of a power supply device according to a second exemplary embodiment.

In the first exemplary embodiment described above, an example in which core material 63 is embedded in cover body part 61 has been described. However, the core material of the present invention is not limited to the above aspect. For example, a part of the core material may be exposed from the cover body part. The part to be exposed can be an end part in the longitudinal direction of the cover body part or a side surface. As an example, a cover part according to a second exemplary embodiment is shown in a longitudinal cross-sectional view of FIG. 8. In this example, both end parts in the longitudinal direction of core material 63B protrude from cover body part 61. Core material 63B of cover part 60B includes a pair of exposed parts 64 respectively exposed from both end parts in the longitudinal direction of cover body part 61. Each exposed part 64 includes exposed piece 64a extending downward from the end part of cover body part 61, and exposed piece 64b extending along upper surface 3a of end plate 3 in the horizontal direction on a side of upper surface 3a of end plate 3. Cover part 60B can be fixed to battery stack 2 by screwing exposed piece 64b and upper surface 3a of end plate 3 with screw 65 or the like. Due to this, in addition to the fixing structure using locking claw part 62, core material 63B is also fixed to end plate 3, so that cover part 60B is less likely to be detached from battery stack 2. In particular, the fixing structure made of metal stabilizes the mechanical strength of the fixing. By fixing the metal end plate and the metal core body, it is also possible to obtain an effect of enhancing heat dissipation.

When core material 63B is fixed to the upper surface of end plate 3, a fixing structure using locking claw part 62 can be omitted.

Third Exemplary Embodiment

Figure 9:
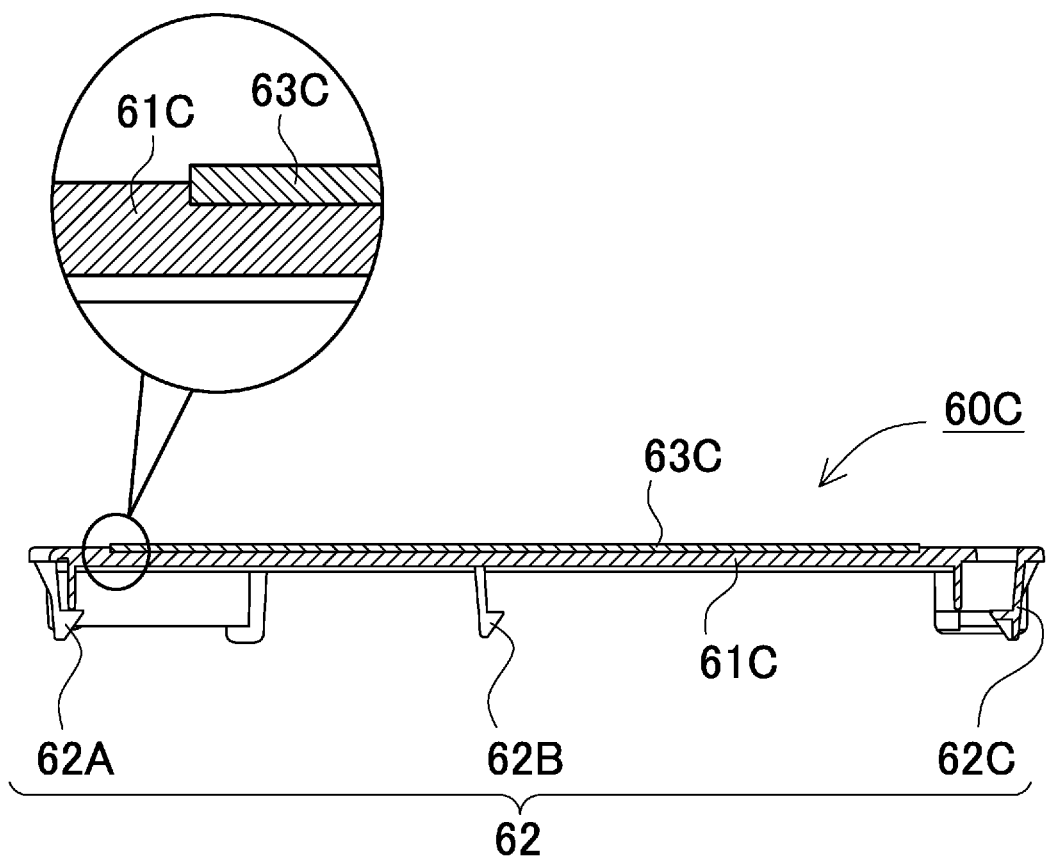
FIG. 9 is a transverse cross-sectional view with a partially enlarged view of a cover part according to a third exemplary embodiment.
Figure 10:
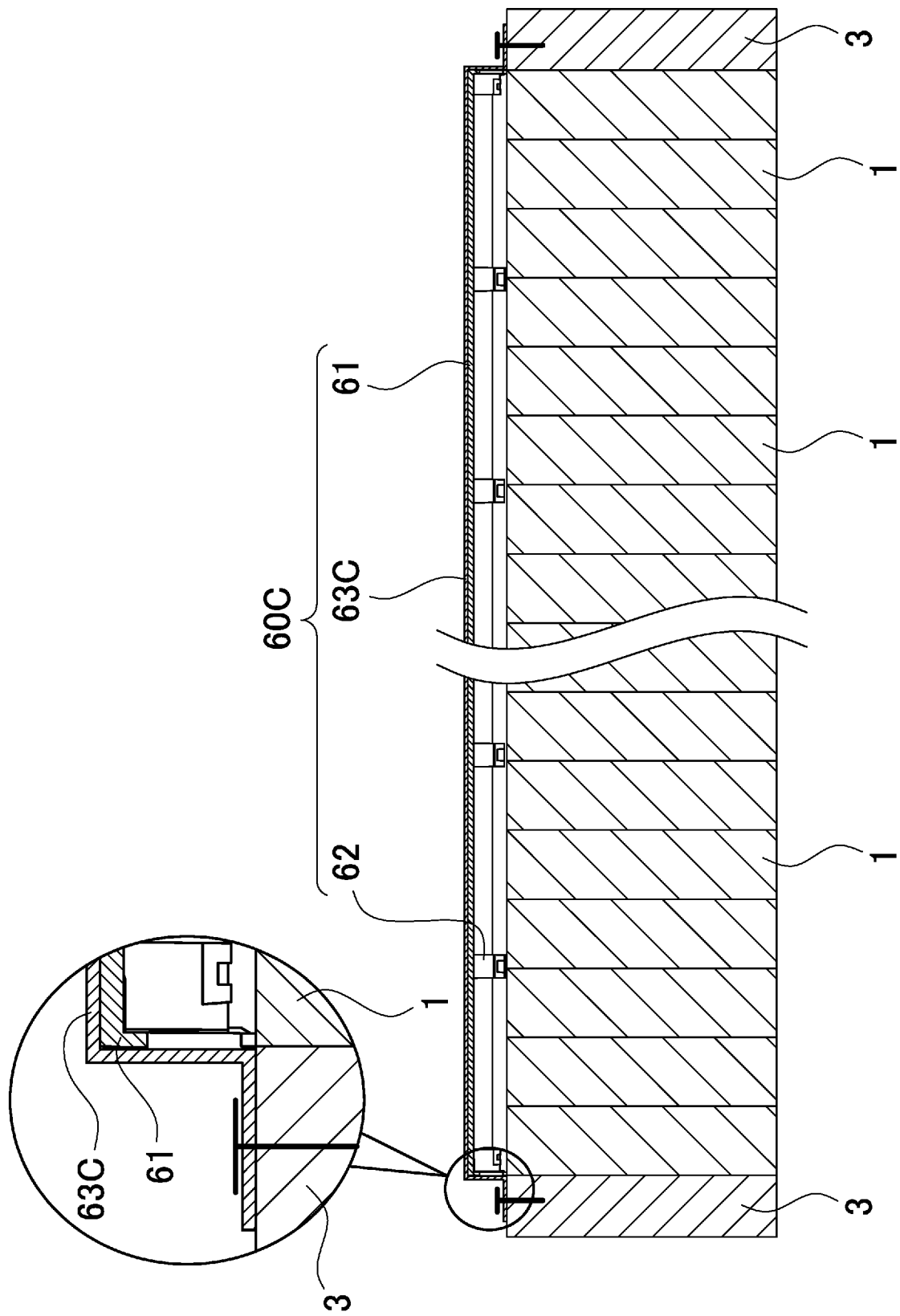
FIG. 10 is a schematic longitudinal cross-sectional view with a partially enlarged view of a power supply device according to the third exemplary embodiment.

The position where the core material is exposed from the cover body part is not limited to the circumferential direction of the cover body, and may be on the main surface. Such an example is shown in FIGS. 9 and 10 as cover part 60C according to a third exemplary embodiment. Cover part 60C has core material 63C exposed from the entire upper surface of cover body part 61C. Core material 63C exposed from the entire upper surface of cover body part 61C makes it possible to increase a part where core material 63C is exposed from cover body part 61C. As a result, in addition to the effect that the cover part is hardly detached from the battery stack, the heat dissipation from the exposed part of core material 63C to the outside can be further enhanced.

Fourth Exemplary Embodiment

Figure 11:
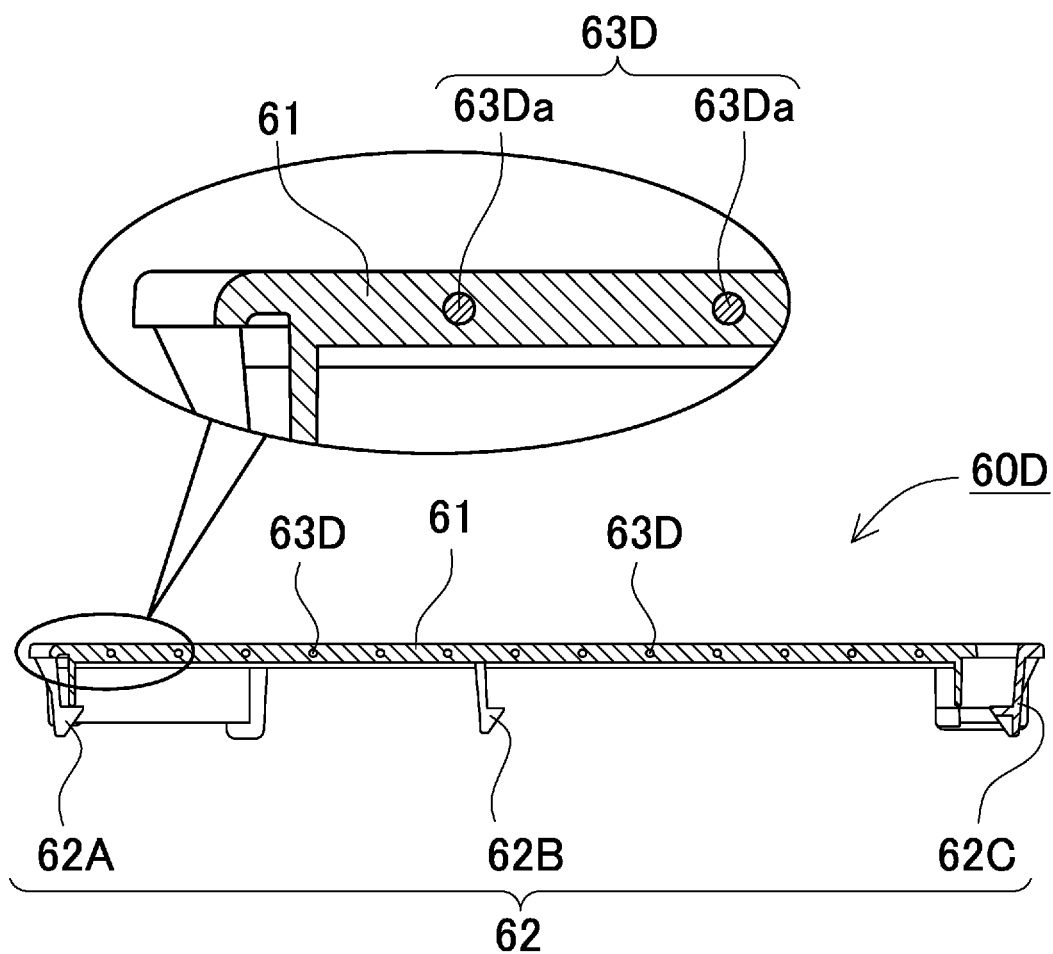
FIG. 11 is a transverse cross-sectional view with a partially enlarged view of a cover part according to a fourth exemplary embodiment.

Furthermore, the metal core material of the present invention is not limited to the above-described plate shape. For example, a wire material such as an iron wire or a rod-like wire can be adopted. In core material 63D shown in FIG. 11, a plurality of wire materials 63Da are embedded in the lateral direction of cover part 60D at predetermined intervals. The diameter of wire materials 63Da is about 1 mm to 1.5 mm. This makes it possible to reduce the volume of the core material, and to suppress a weight increase due to the addition of the core material. This is advantageous for in-vehicle applications where fuel efficiency is particularly emphasized. By increasing the surface area of the core material, it is also possible to obtain an effect of improving adhesion between the core material and the cover body part.

On the other hand, in the above-described first to third exemplary embodiments, the plate-shaped core material is spread to cover the upper surface of battery assembly 2, and a gap is not provided between the wire materials unlike the core material of a fourth exemplary embodiment. Therefore, even when a high-pressure gas is released, it is possible to avoid the gas from passing through the gap to blow out to the outside of the power supply device.

Power supply device 100 described above can be used as a power source for a vehicle that supplies electric power to a motor that causes an electric vehicle to travel. As an electric vehicle on which power supply device 100 is mounted, an electric vehicle such as a hybrid automobile or a plug-in hybrid automobile that travels by both an engine and a motor, or an electric automobile that travels only by a motor can be used, and is used as a power source of these vehicles. Note that an example will be described in which in order to obtain electric power for driving the electric vehicle, a large number of power supply devices 100 described above are connected in series or in parallel, and a large-capacity, high-output power supply device to which a necessary controlling circuit is further added is constructed.

(Power Supply Device for Hybrid Automobile)

Figure 12:
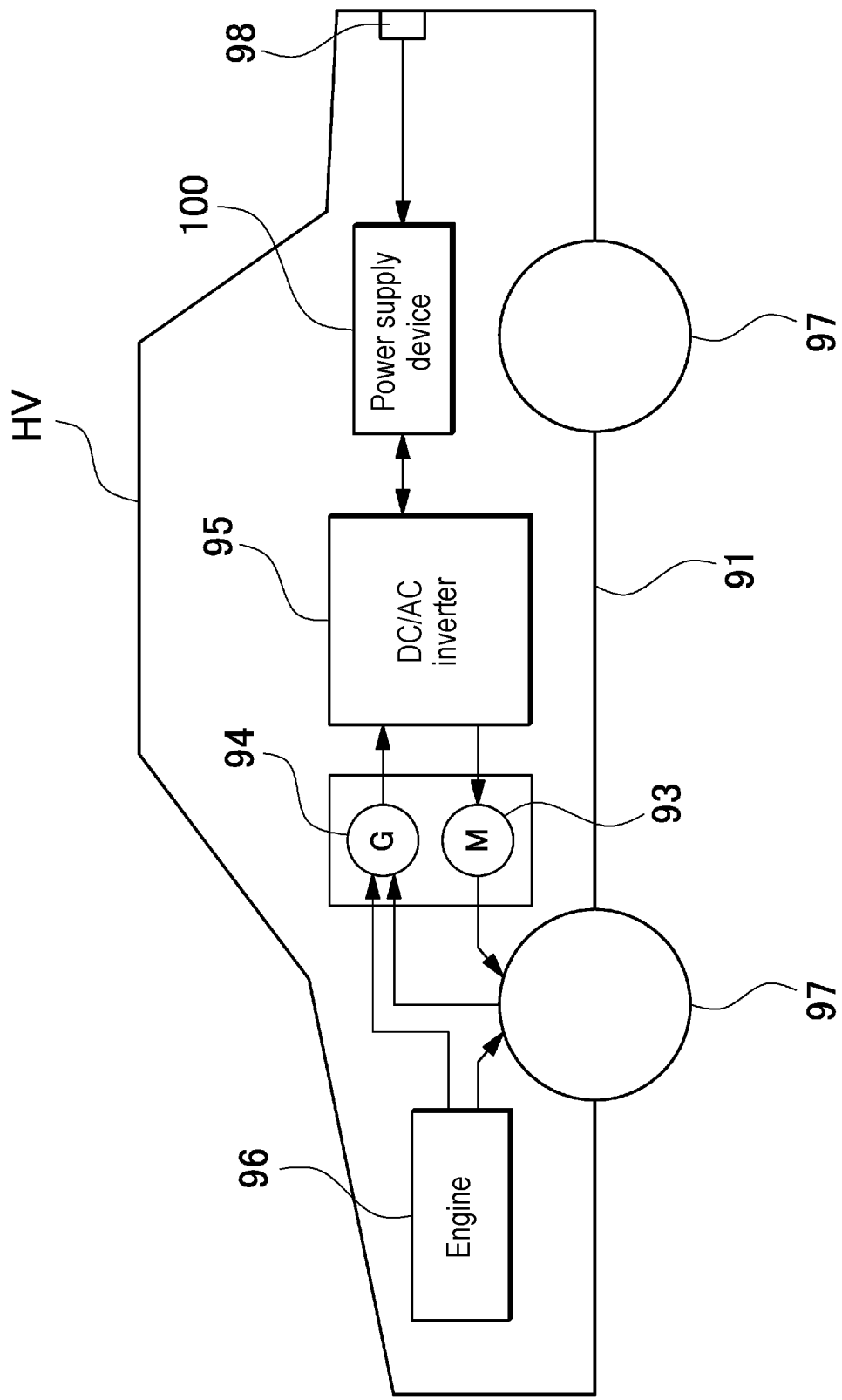
FIG. 12 is a block diagram showing an example of a power supply device mounted in a hybrid automobile that travels by an engine and a motor.

FIG. 12 shows an example in which power supply device 100 is mounted on a hybrid automobile that travels by both an engine and a motor. Vehicle HV on which power supply device 100 shown in this figure is mounted includes vehicle body 91, engine 96 and running motor 93 that cause vehicle body 91 to travel, wheels 97 driven by engine 96 and running motor 93, power supply device 100 that supplies electric power to motor 93, and power generator 94 that charges the battery of power supply device 100. Power supply device 100 is connected to motor 93 and power generator 94 via DC/AC inverter 95. Vehicle HV travels by both motor 93 and engine 96 while charging or discharging the battery of power supply device 100. Motor 93 is driven in a region where an engine efficiency is low, for example, during acceleration or low-speed traveling, and causes the vehicle to travel. Motor 93 is driven by electric power supplied from power supply device 100. Power generator 94 is driven by engine 96 or driven through regenerative braking when braking is applied to the vehicle to charge the battery in power supply device 100. As shown in FIG. 12, vehicle HV may include charging plug 98 for charging power supply device 100. By connecting charging plug 98 to an external power source, it is possible to charge power supply device 100.

(Power Supply Device for Electric Automobile)

Figure 13:
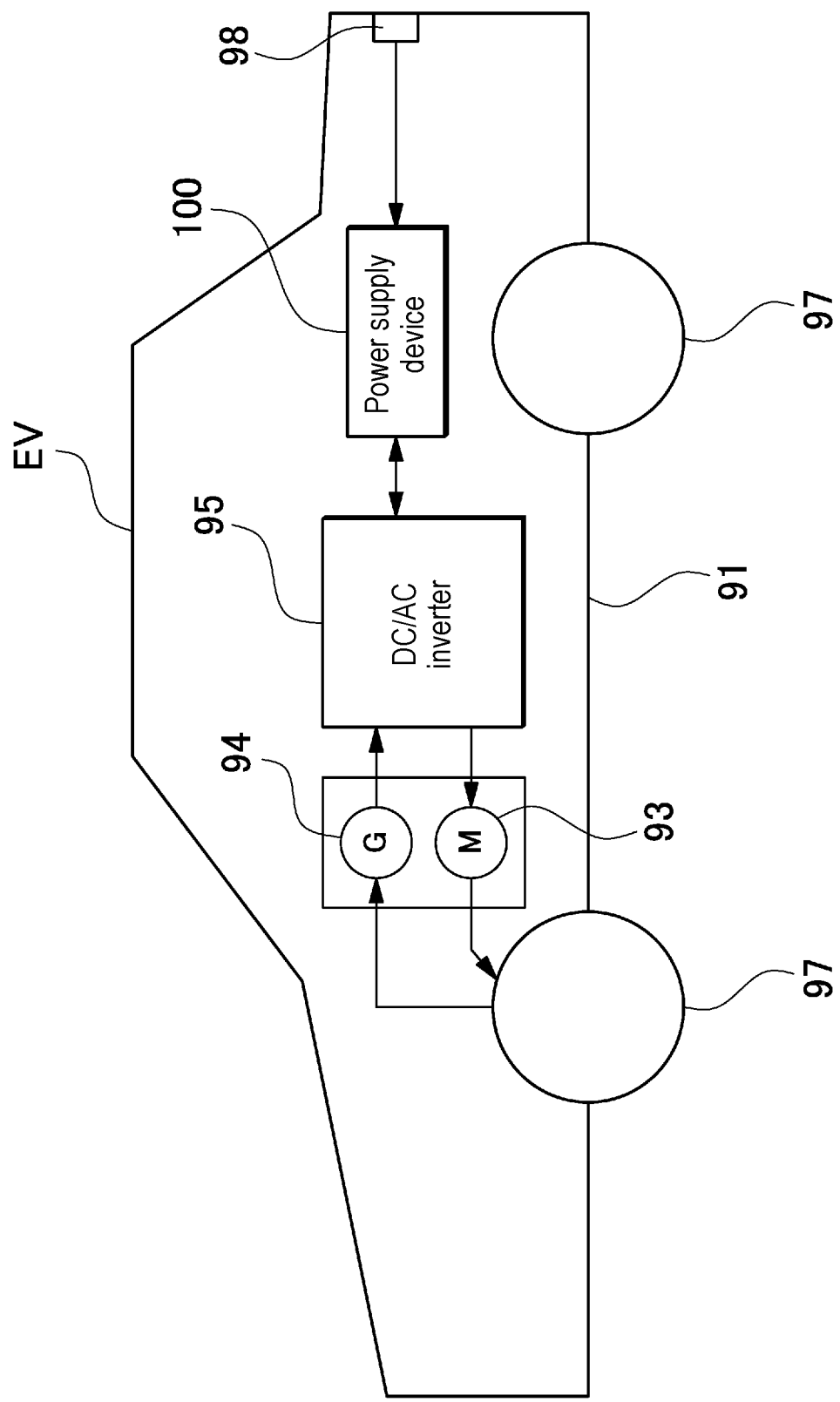
FIG. 13 is a block diagram showing an example of a power supply device mounted in an electric automobile that travels only by a motor.

FIG. 13 shows an example in which power supply device 100 is mounted on an electric automobile that travels only by a motor. Vehicle EV on which power supply device 100 shown in this figure is mounted includes vehicle body 91, running motor 93 that causes vehicle body 91 to travel, wheels 97 driven by motor 93, power supply device 100 that supplies electric power to motor 93, and power generator 94 that charges the battery of power supply device 100. Power supply device 100 is connected to motor 93 and power generator 94 via DC/AC inverter 95. Motor 93 is driven by electric power supplied from power supply device 100. Power generator 94 is driven by the energy at the time of applying regenerative braking to vehicle EV, and charges the battery of power supply device 100. Vehicle EV further includes charging plug 98, and power supply device 100 can be charged by connecting charging plug 98 to an external power source.

(Power Supply Device for Power Storage Device)

Figure 14:
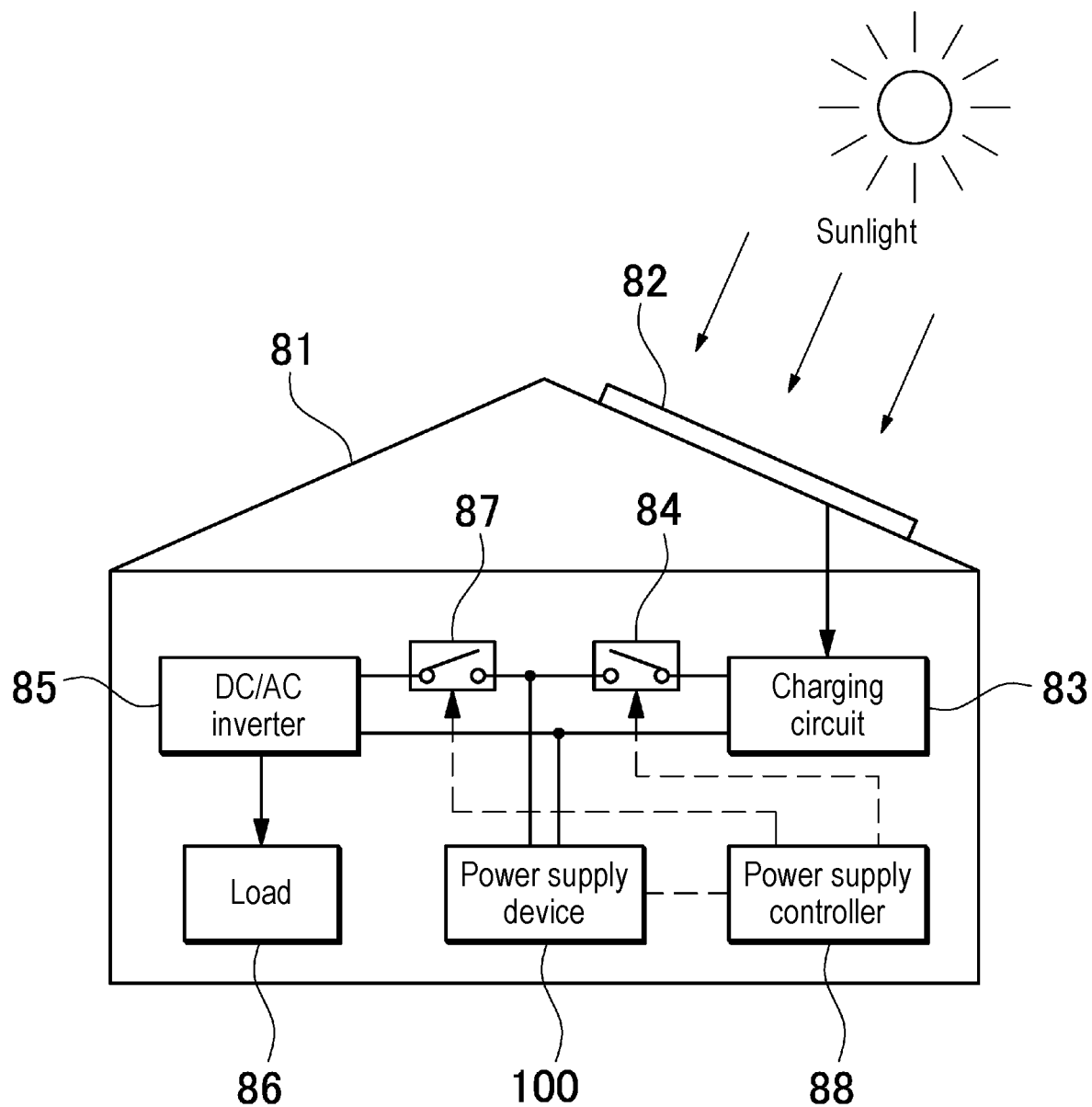
FIG. 14 is a block diagram showing an example applied to a power supply device for power storage.
Figure 15:
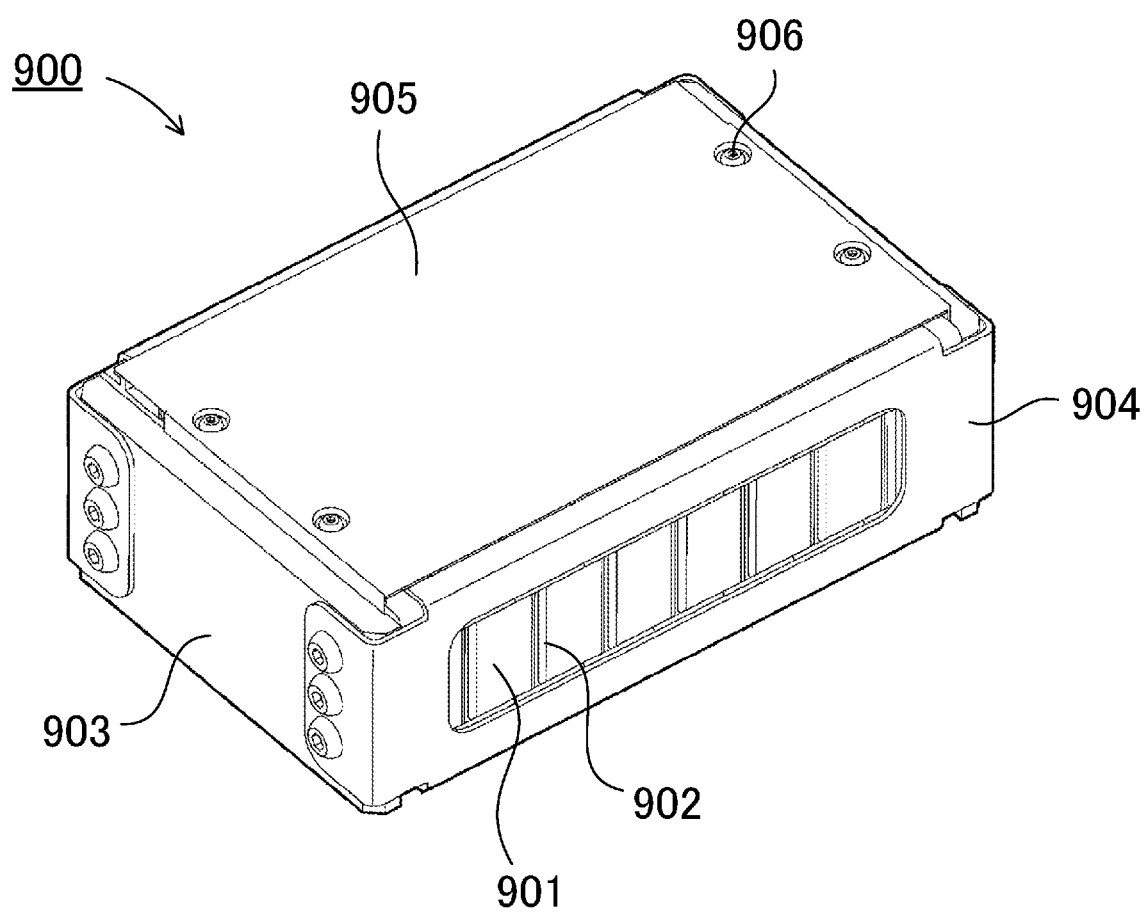
FIG. 15 is a perspective view showing a conventional power supply device.

The application of the power supply device of the present invention is not limited to a power source for a motor that causes the vehicle to travel. The power supply device according to the exemplary embodiments can be used as a power source for a power storage device that performs power storage by charging the battery with electric power generated by photovoltaic power generation, wind power generation, or other methods. FIG. 14 shows a power storage device that performs power storage by charging the battery of power supply device 100 by solar battery 82.

The power storage device shown in FIG. 14 charges the battery of power supply device 100 with electric power generated by solar battery 82 disposed on a roof or a rooftop of building 81 such as a house and a factory. This power storage device charges the battery of power supply device 100 via charging circuit 83 with solar battery 82 serving as a charging power source, and then supplies electric power to load 86 via DC/AC inverter 85. Thus, this power storage device includes a charge mode and a discharge mode. In the power storage device shown in the figure, DC/AC inverter 85 and charging circuit 83 are connected to power supply device 100 via discharging switch 87 and charging switch 84, respectively. Discharging switch 87 and charging switch 84 are turned on and off by power supply controller 88 of the power storage device. In the charge mode, power supply controller 88 turns on charging switch 84 and turns off discharging switch 87 to allow charging from charging circuit 83 to power supply device 100. When charging is completed and the battery is fully charged or when the battery is in a state where a capacity of a predetermined value or greater is charged, power supply controller 88 turns off charging switch 84 and turns on discharging switch 87 to switch the mode to the discharge mode and allow discharging from power supply device 100 to load 86. As necessary, power supply controller 88 can supply electric power to load 86 and charge power supply device 100 simultaneously by turning on charging switch 84 and turning on discharging switch 87.

Although not illustrated, the power supply device can also be used as a power source of a power storage device that performs power storage by charging a battery using midnight electric power at night. The power supply device charged with midnight electric power is charged with the midnight electric power, which is surplus electric power generated by a power station, and outputs the electric power during the daytime when an electric power load increases. Thus, peak electric power during the daytime can be limited to a small value. The power supply device can also be used as a power source charged with both output of a solar battery and the midnight electric power. This power supply device can efficiently perform power storage effectively using both electric power generated by the solar battery and the midnight electric power in consideration of weather and electric power consumption.

The power storage system as described above can be suitably used in applications such as a backup power supply device that can be installed in a rack of a computer server, a backup power supply device for a radio base station for a cellular phone or the like, a power storage power source for use in a house or a factory, a power storage device combined with a solar battery such as a power source for street lights, and a backup power source for traffic lights and traffic indicators on roads.

INDUSTRIAL APPLICABILITY

The power supply device according to the present invention and a vehicle including the same are suitably used as a large-current power supply used for a power source of a motor for driving an electric vehicle such as a hybrid automobile, a fuel cell automobile, an electric automobile, and an electric motorcycle. Examples include a power supply device for a plug-in hybrid electric automobile and a hybrid type electric vehicle that can switch between an EV running mode and a HEV running mode and an electric automobile.

Furthermore, the power storage system can also be appropriately used in applications such as a backup power supply device that can be installed in a rack of a computer server, a backup power supply device for a radio base station for a cellular phone or the like, a power storage power source for use in a house or a factory, a power storage device combined with a solar battery such as a power source for street lights, and a backup power source for traffic lights and the like.

REFERENCE MARKS IN THE DRAWINGS

100: power supply device
1: battery cell
1*a*: outer covering can
1*b*: sealing plate
2: battery stack
3: end plate
4: fastening member
10: terminal surface
11: electrode terminal
12: end surface spacer
13: gas discharge valve
14: bus bar
19: fastener
30: separator
31: mounting plate part
32: upper peripheral wall
33: longitudinal peripheral wall
34: separator-side locking piece
34*a*: separator-side extending part
34*b*: separator-side protruding part
34*ba*: separator-side inclined surface
34*bb*: separator-side, contact surface
36: first through-hole
40: body part
41: fastening member-side fixing part
42: through-hole
44: bent part
50: holder part
51: locking hole
60, 60B, 60C, 60D: cover part
61, 61C: cover body part
62, 62A, 62B, 62C: locking claw part
62*a*: locking claw extending part
62*b*: locking claw protruding part
62*ba*: locking claw inclined surface
62*bb*: locking claw contact surface
63, 63B, 63C, 63D: core material
63Da: wire material
64: exposed part
64*a*, 64*b*: exposed piece
65: screw
81: building
82: solar battery
83: charging circuit
84: charging switch
85: DC/AC inverter
86: load
87: discharging switch
88: power supply controller
91: vehicle body
93: motor
94: power generator
95: DC/AC inverter
96: engine
97: wheel
98: charging plug
900: power supply device
901: battery cell
902: spacer
903: end plate
904: bind bar
905: top cover
906: screw
HV: vehicle
EV: vehicle
T: thickness of battery cell
W: width of battery cell
CT: thickness of cover body part

The invention claimed is:

1. A power supply device comprising:
a battery assembly including a plurality of battery cells and extended in an extension direction; and
a cover part of an insulating property, the cover part covering one surface extended in the extension direction of the battery assembly, wherein
the cover part includes a plurality of fixtures for fixing the cover part to an upper surface of the battery assembly, the plurality of fixtures being provided in the extension direction, and
the cover part includes a core material made of metal, and further includes resin,
the core material is in a plate shape, and
the core material formed into the plate shape includes, at both ends of the core material, exposed parts that are exposed from the cover part and are extended and fixed to upper surfaces of the pair of end plates.

2. The power supply device according to claim 1, wherein the plurality of battery cells each include a prismatic outer covering can,
the battery assembly is a stack in which the plurality of battery cells are stacked, the power supply device further includes
a pair of end plates covering both side end surfaces of the battery stack, and
a separator held between two of the plurality of battery cells in a state where the plurality of battery cells are stacked, and
the separator includes a reception part receiving a corresponding fixture among the plurality of fixtures at a position corresponding to the corresponding fixture in a state where the cover part is fixed.

3. The power supply device according to claim 1, wherein the power supply device further includes a holder part provided between the cover part and an upper surface of the stack of the plurality of battery cells, and
the holder part includes a reception part receiving each of the plurality of fixtures at a position corresponding to the each of the plurality of fixtures in a state where the cover part is fixed.

4. The power supply device according to claim 1, wherein the plurality of battery cells each include a safety valve that opens in response to an internal pressure change of each of the battery cells, and
an upper surface of the battery assembly is configured with a surface of each of the plurality of battery cells on which the safety valve is provided.

5. The power supply device according to claim 1, wherein at least a part of the core material formed into the plate shape is exposed from the cover part.

6. The power supply device according to claim 1, wherein the core material is formed into a plurality of rod shapes embedded apart in the resin.

7. The power supply device according to claim 1, wherein the cover part includes the core material that is insert-molded.

8. The power supply device according to claim 1, wherein the cover part includes a rectangular shape, and the rectangular shape includes an aspect ratio of 5 or more.

9. A vehicle including the power supply device according to claim 1, the vehicle comprising:
the power supply device;
a motor for running to which electric power is supplied from the power supply device;
a vehicle body on which the power supply device and the motor are mounted; and
a wheel that is driven by the motor to cause the vehicle body to travel.

10. A power storage device including the power supply device according to claim 1, the power storage device comprising:
the power supply device; and
a power supply controller that controls charging to and discharging from the power supply device, wherein the power supply controller enables charging to the plurality of battery cells with electric power from an outside, and controls charging to the plurality of battery cells.

* * * * *